May 5, 1970          A. C. KOENIG          3,509,613
METHOD OF FORMING AN AIR CONDITIONER LOUVER STRUCTURE
Filed Feb. 14, 1968          3 Sheets-Sheet 1
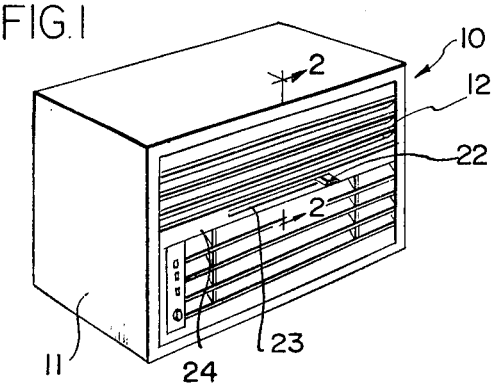
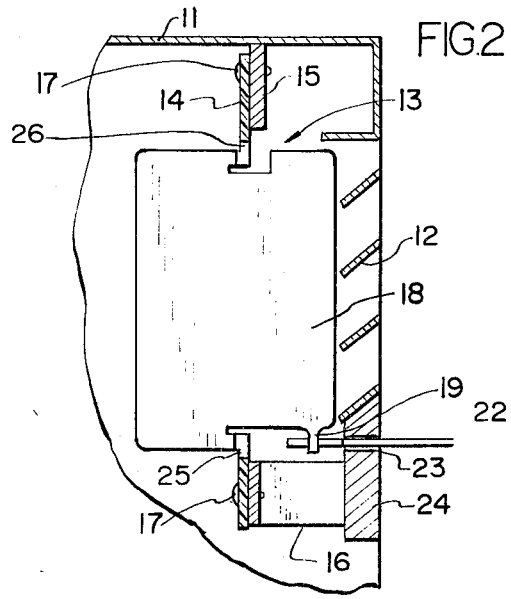
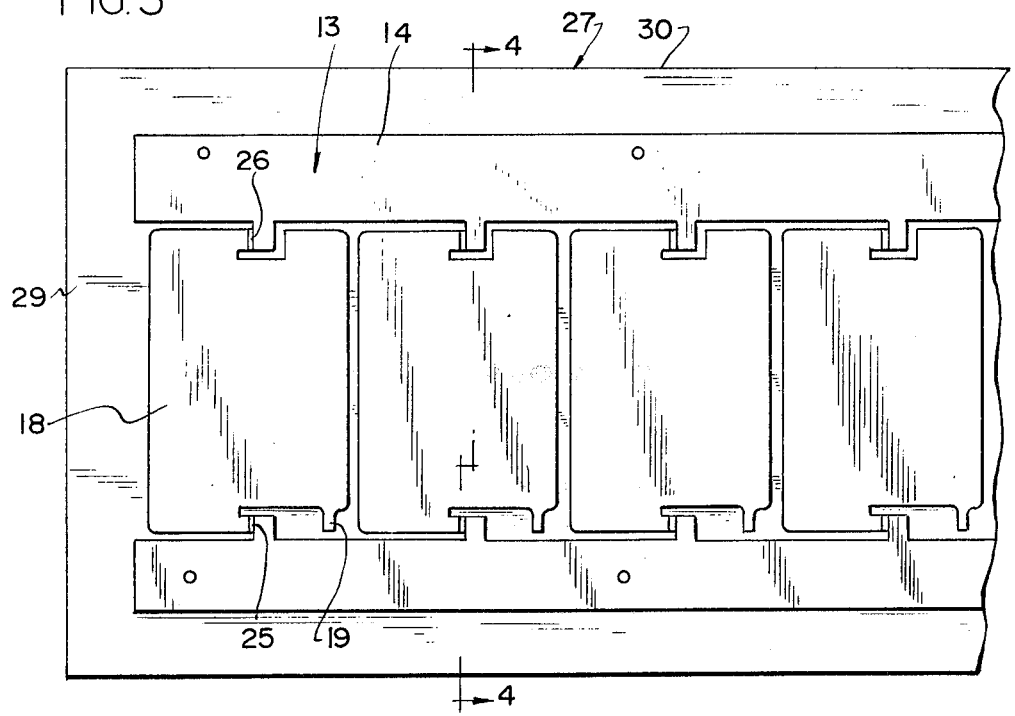
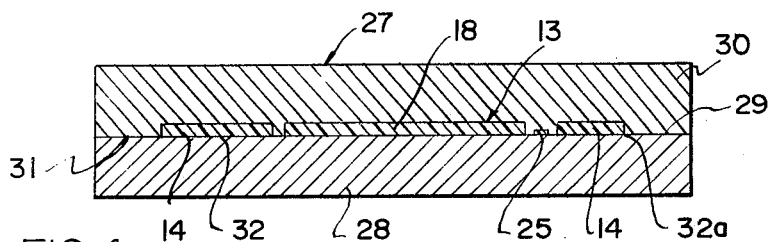
INVENTOR.
ANDREW C. KOENIG
BY *Hofgren, Wegner, Allen, Stellman & McCord*
ATTORNEYS

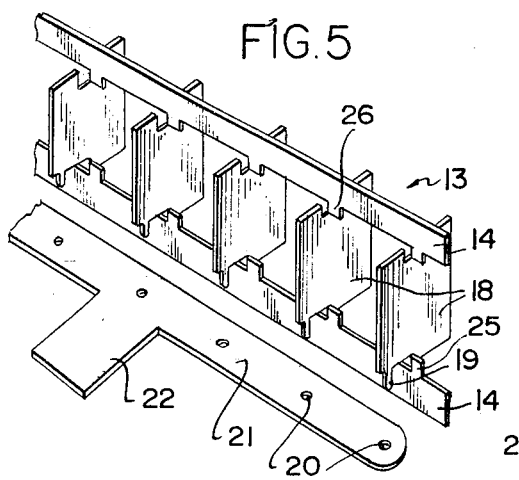
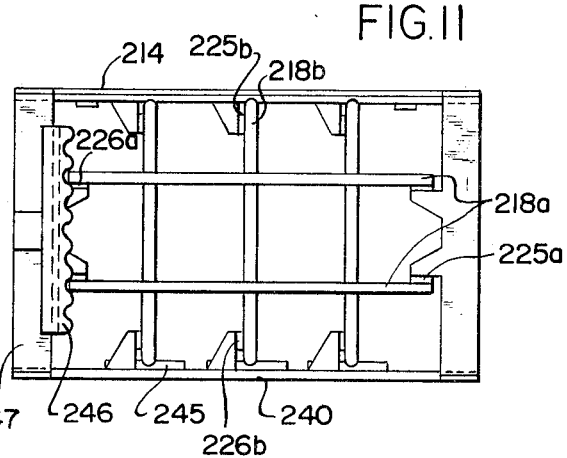
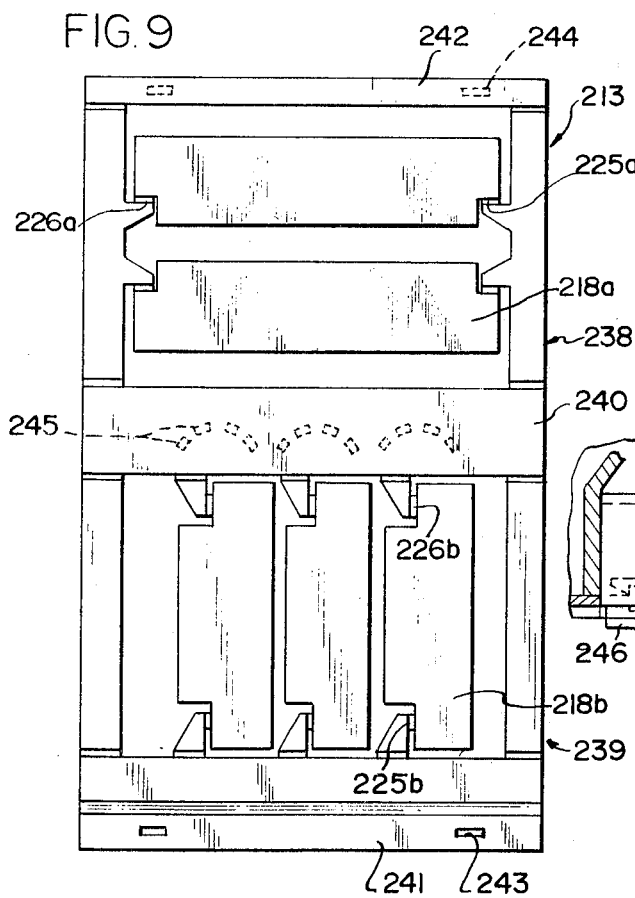
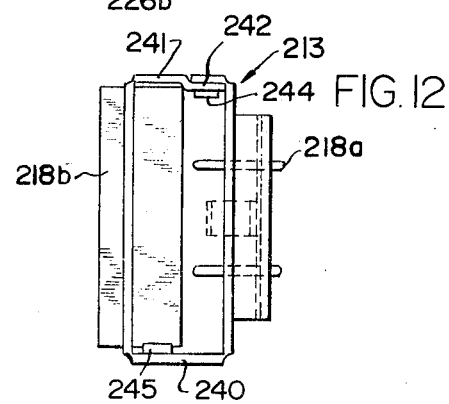
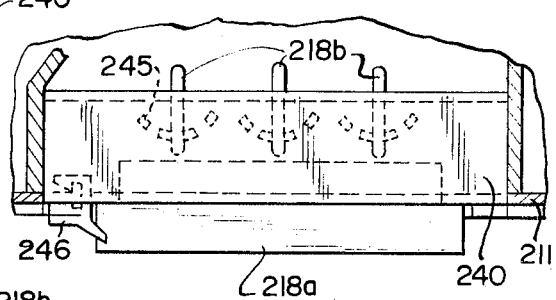
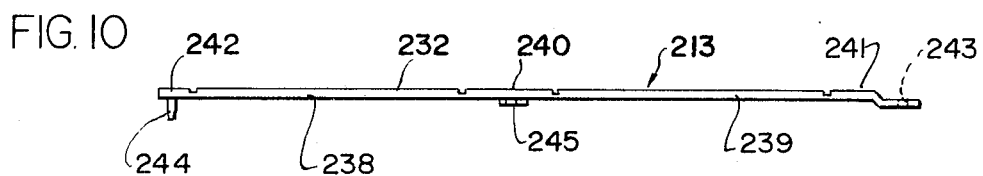

United States Patent Office 3,509,613
Patented May 5, 1970

1

3,509,613
METHOD OF FORMING AN AIR CONDITIONER LOUVER STRUCTURE
Andrew C. Koenig, Evansville, Ind., assignor to Whirlpool Corporation, a corporation of Delaware
Filed Feb. 14, 1968, Ser. No. 705,542
Int. Cl. B29; B29c 17/02
U.S. Cl. 29—157                                    9 Claims

ABSTRACT OF THE DISCLOSURE

A method of forming a louver structure for use in an air conditioner wherein the louver structure is molded in a substantially flat configuration, and the louvers are hingedly carried therein and turned out of the flat configuration in use in the air conditioner. A mold apparatus is provided for molding the louver structure wherein one mold section is substantially planar and the other mold section is machined for cooperating with the planar section to form the mold structure.

---

This invention relates to louver structures and in particular to louver structures such as for use in air conditioners.

In air conditioners, it is desirable to provide louvers for directing the air as desired by the user. Heretofore, such louver structures have been molded by relatively complex molding apparatus as the louvers thereof are disposed angularly to the flat frame, and thus multiple part mold structures have been required to satisfactorily mold the relatively complex structure. The present invention comprehends an improved louver structure wherein the structure is molded in a substantially flat configuration, and the louvers are turned from the flat configuration in use.

Thus, a principal feature of the present invention is the provision of a new and improved louver structure and apparatus for forming the same.

Another feature of the invention is the provision of such a louver structure formed by the steps of molding a flexible plastic in a substantially flat configuration defining a frame, a plurality of louvers within the frame, and connecting elements between the respective louvers and the frame, working the connecting elements by twisting the connecting elements to turn the louvers out of the flat configuration immediately upon completion of the molding operation, and connecting a control means to the louvers to maintain them at all times angularly to the flat configuration.

A further feature of the invention is the provision of such a louver structure wherein one face of the structure is molded substantially in a single plane.

Still another feature of the invention is the provision of such a louver structure wherein the plastic comprises polypropylene.

A yet further feature of the invention is the provision of such a louver structure wherein new and improved means are provided for controlling the angular disposition of the louvers in the air conditioner.

Yet another feature of the invention is the provision of such a louver structure wherein one of the louvers is arranged to turn about a first axis and another of said louvers is arranged to turn about an axis at an angle to the first axis.

2

Still another feature of the invention is the provision of such a louver structure wherein at least one of said louvers is arranged to turn about a vertical axis and another of said louvers is arranged to turn about a horizontal axis in the air conditioner.

Another feature of the invention is the provision of a new and improved apparatus for forming a louver structure including a first mold section defining a substantially planar mold face, and a second mold section having a machined cavity face for cooperating with the flat mold face to form a substantially flat air conditioner louver structure having one face substantially planar.

A yet further feature of the invention is the provision of such an apparatus defining in the louver structure a substantially flat parting line.

A further feature of the invention is the provision of such an apparatus wherein each of the mold sections is a one piece section.

Other features and advantages of the invention will be apparent from the following description taken in connection with the accompanying drawing wherein:

FIGURE 1 is an isometric view of an air conditioner provided with a louver structure embodying the invention;

FIGURE 2 is an enlarged fragmentary vertical section thereof taken substantially along the line 2—2 of FIGURE 1;

FIGURE 3 is a fragmentary front elevation of the louver structure as molded in the flat configuration in a molding apparatus embodying the invention.

FIGURE 4 is a vertical section taken substantially along the line 4—4 of FIGURE 3;

FIGURE 5 is a fragmentary exploded perspective view of the louver structure with the louvers turned from the flat configuration for connection thereto of a control link;

FIGURE 9 is a front elevation of a modified form of louver structure embodying the invention;

FIGURE 10 is a side elevation thereof;

FIGURE 11 is a front elevation of the louver structure arranged in a box-like configuration with the louvers turned from the flat configuration;

FIGURE 12 is an end elevation thereof; and

FIGURE 13 is a fragmentary bottom plan view thereof as installed in an air conditioner.

Figure 6:
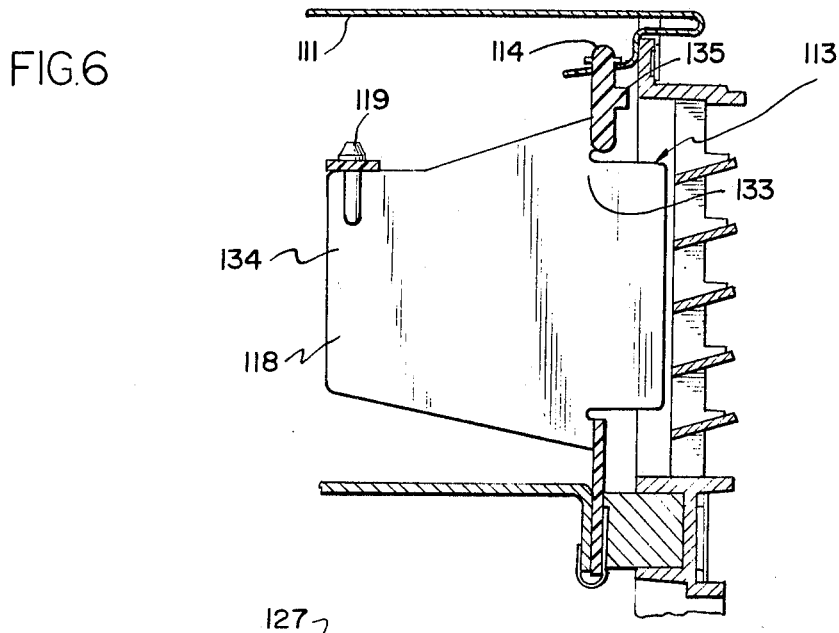
FIGURE 6 is an enlarged fragmentary vertical section of another form of louver structure embodying the invention.

In the exemplary embodiment of the invention as disclosed in FIGURES 1 through 5 of the drawing, an air conditioner generally designated 10 is shown to comprise a cabinet 11 having a front grill 12 through which refrigerated air is delivered. The flow of the refrigerated air is controlled in the air conditioner 10 by means of a louver structure generally designated 13 installed in the cabinet 11 rearwardly adjacent the grill 12.

Louver structure 13 includes a frame portion 14 secured to brackets 15 and 16 carried by the cabinet 11, by suitable means such as screws 17. As shown in FIGURES 2 and 3, the louver structure 13 further includes a plurality of louvers 18 which are formed in a flat configuration, as shown in FIGURE 3, and mounted in the air conditioner 10 at an angle to the flat configuration, as shown in FIGURE 2. Each of the louvers is provided with a depending pivot connector 19 adapted to be received in a corresponding opening 20 in a control link 21 having a forwardly extending handle 22 projecting through a slot 23 in the cabinet front 24 for manual adjustment of the angular position of the louvers 18 from the front of the cabinet. The louvers are caused to turn about a vertical axis defined by a pair of hinge connectors 25 and 26 connecting the respective louvers to the frame portion 14 of the louver structure 13.

Whereas the louvers 18 are disposed in the air conditioner 10 in an angular relationship to the flat configuration of the frame 14, the present invention comprehends an improved louver structure wherein the louvers are formed in the flat configuration, as shown in FIGURES 3 and 4, and turned from the flat configuration as a final step in the forming process. Thus, as shown in FIGURE 4, the louver structure 13 is molded of a suitable flexible plastic, such as polypropylene, in a mold generally designated 27 including a first section 28 having a flat mold face 29, and a second mold section 30 having a machined mold face 31. As shown in FIGURES 3 and 4, the louver structure 13 is molded in a flat configuration with the face 32 thereof substantially planar. The edge 32a of surface 32 thereby defines a substantially planar parting line in the louver structure. Upon completion of the molding step, the structure 13 is removed from the mold 27, and the louvers are immediately turned on the connectors 25 and 26 to effectively work the connectors to provide an improved flexible hinged connection of the respective louvers to the frame 14.

As shown in FIGURE 5, the position of the respective louvers 18 is controlled by the link 21, with the pivots 19 of the respective louvers received in the openings 20 for concurrent hinged turning of the louvers by the lateral movement of the control link.

Figure 7:
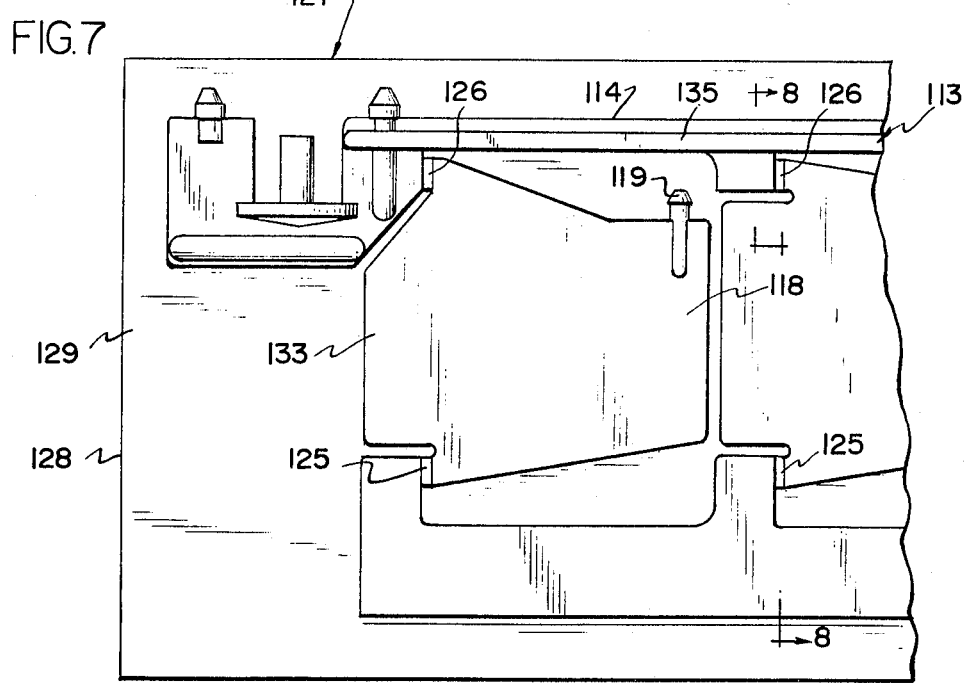
FIGURE 7 is a fragmentary front elevation of the louver structure of FIGURE 6 as molded in the flat configuration in a molding apparatus embodying the invention.
Figure 8:
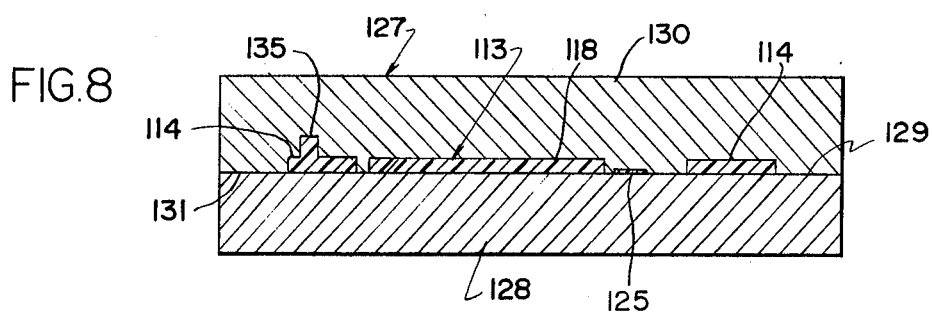
FIGURE 8 is a vertical section taken substantially along the line 8—8 of FIGURE 7.

Turning now to the embodiment of FIGURES 6 through 8, a modified form of louver structure embodying the invention, generally designated 113, is shown to comprise a louver structure generally similar to louver structure 13, but having a modified form of louver 118 wherein the hinges 125 and 126 are disposed adjacent one edge 133 of the louver. The pivot connector 119 upstands from the opposite edge 134 of the louver. The frame 114 is provided with a reinforcing rib 135.

The louver structure 113 may be formed in a mold 127 which is generally similar to mold 27, but wherein the face 129 of the mold section 128 is machined to a small degree, while yet being generally planar. The bulk of the mold machining is provided in the mold section 130 similarly as in mold section 30 of mold 27. Thus, in each of molds 27 and 127, each mold section comprises a one piece section effectively minimizing the cost of the mold and facilitating the molding operation for improved economy in the formation of the louver structures.

Turning now to FIGURES 9 through 13, a further modified form of louver structure embodying the invention, generally designated 213, is shown to comprise a louver structure generally similar to louver structure 13 in being formed in a flat configuration, as shown in FIGURES 9 and 10. Mold structure 213, however, differs from mold structure 13 in the provision of a portion 238 thereof having horizontal louvers 218a in addition to a portion 239 having vertical louvers 218b. The louver structure 213, as best seen in FIGURE 10, includes a substantially planar face 232 in the molded arrangement. As shown in FIGURE 12, the louver structure 213 is folded into a box-like configuration wherein a connecting portion 240 between portions 238 and 239 defines the bottom wall, and a first end portion 241 is overlapped by the opposite end portion 242 to define the top wall of the box configuration. As seen in FIGURES 11 and 12 in the box configuration, the louvers 218b turn about a vertical axis, and the louvers 218a turn about a horizontal axis defined by their respective hinge connections 225b and 225a and 226b and 226a, respectively. The end portion 241 may be provided with suitable openings 243, and the end portion 242 may be provided with suitable tabs 244 for interlocking the end portions in the box configuration of FIGURE 12.

The vertical louvers may be adjustably positioned in a plurality of different angularly related positions by means of a plurality of detent lugs 245 upstanding from the bottom wall portion 240. A detent member 246 may be secured to an end portion 247 of the frame 214 for selectively retaining the horizontal louvers 218a in a plurality of different angularly related positions about the horizontal hinge axis thereof.

Thus, louver structure 213 is similar to louver structure 13 and 113 in the formation thereof in a flat configuration and with the subsequent turning of the louvers out of the flat configuration in the use arrangement permitting the louver structure 213 to be formed by an inexpensive two piece mold eliminating moving parts and the like while yet providing an improved louver structure.

The reference numerals identifying the elements of louver structure 113 are similar to the numerals identifying similar elements of louver structure 13, except being one hundred higher. The reference numerals identifying the elements of louver structure 213 are similar to the numerals identifying similar elements of louver structure 13, except being two hundred higher.

The embodiments of the invention in which an exclusive property or privilege is claimed are defined as follows:

1. The method of forming an air conditioner louver structure comprising the steps of: molding a flexible plastic in a substantially flat configuration defining a frame, a plurality of flatwise aligned louvers within said frame, and connecting elements between said respective louvers and said frame; working said connecting elements by turning said louvers out of the flat configuration substantially immediately upon completion of the molding operation; and connecting a control means to said louvers to maintain them angularly to said flat configuration.

2. The method of forming the air conditioner louver structure of claim 1 wherein one face of said structure is molded substantially in a single plane.

3. The method of forming the air conditioner louver structure of claim 1 wherein said plastic comprises polypropylene.

4. The method of forming the air conditioner louver structure of claim 1 wherein said louvers are provided with pivot portions for engagement with complementary pivot portions on said control means.

5. The method of forming the air conditioner louver structure of claim 1 wherein one of said louvers is connected to said frame for turning about a first axis, and a second of said louvers is connected to said frame for turning about a second axis at an angle to said first axis.

6. The method of forming the air conditioner louver structure of claim 1 wherein one of said louvers is connected to said frame for turning about a first axis, and a second of said louvers is connected to said frame for turning about a second axis perpendicular to said first axis.

7. The method of forming the air conditioner louver structure of claim 1 wherein said molding step includes molding of detent means on said frame for cooperation with said control means to secure the louvers in any one of a plurality of different positions angularly to said flat configuration.

8. The method of forming an air conditioner louver structure comprising steps of: molding a flexible plastic in a substantially flat configuration defining a frame, a plurality of flatwise aligned louvers within said frame, and connecting elements between said respective louvers and said frame; turning said louvers out of the flat configuration; and connecting a control means to said louvers to maintain them angularly to said flat configuration.

9. The method of forming the air conditioner louver structure of claim 8 wherein said control means comprises adjustable control means for adjustably maintaining said louvers angularly to said flat configuration.

References Cited
UNITED STATES PATENTS

| | | | |
|---|---|---|---|
| 2,900,667 | 8/1959 | Longenecker | 264—339 |
| 2,944,295 | 7/1960 | Sloan | 264—295 |
| 3,019,486 | 2/1962 | Stinson | 264—339 |
| 3,060,832 | 10/1962 | Wright. | |
| 3,093,060 | 6/1963 | Emery. | |
| 3,182,579 | 5/1965 | Wiseman. | |
| 3,234,314 | 2/1966 | Woodard | 264—339 |
| 3,301,164 | 1/1967 | Eberhart | 98—121 |
| 3,320,868 | 5/1967 | Apouchtine. | |
| 3,454,694 | 7/1969 | Delair et al. | 264—295 X |

JOHN F. CAMPBELL, Primary Examiner

D. C. REILEY, Assistant Examiner

U.S. Cl. X.R.

29—160, 434, 527.1; 98—40, 121; 264—295